Patented June 13, 1950

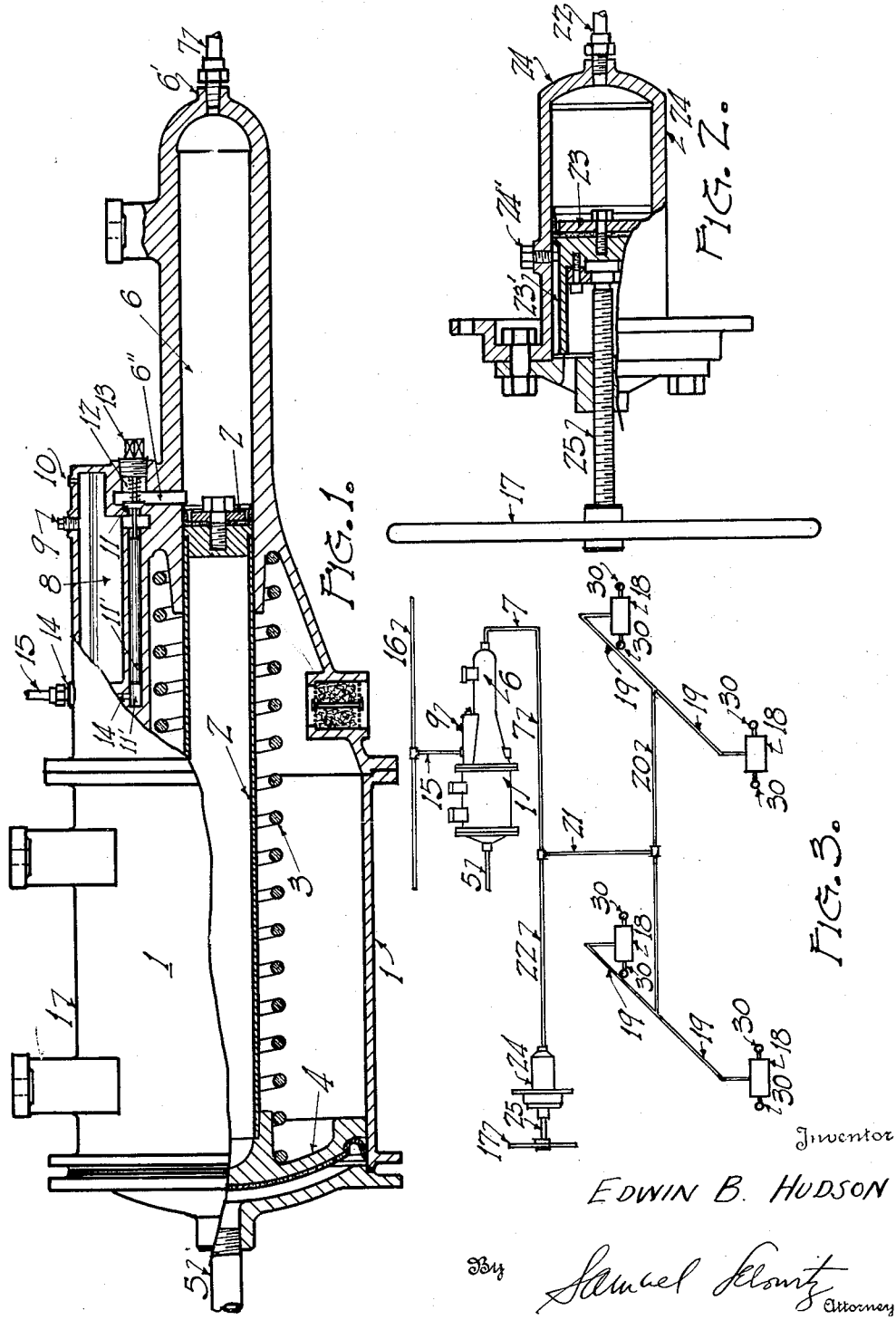

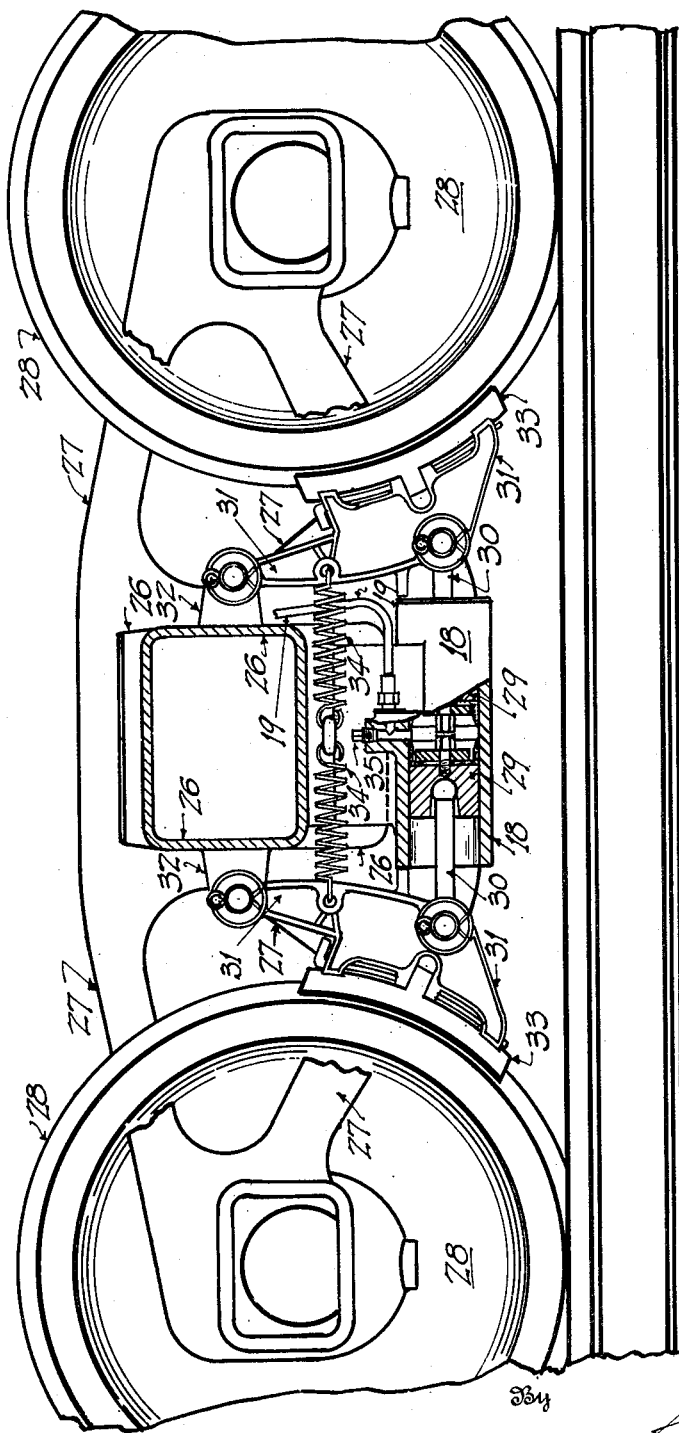

2,511,336

UNITED STATES PATENT OFFICE 2,511,336

FLUID PRESSURE RAILWAY BRAKE WITH AUXILIARY HYDRAULIC BRAKE OPERATING MEANS

Edwin B. Hudson, Middletown, Ohio

Application May 21, 1945, Serial No. 594,812

5 Claims. (Cl. 188—153)

My invention relates to improvements in railway air-braking systems for steam, Diesel and electric railway trains.

Among the principal objectives of my invention is an improved method of transmitting the braking force from a single air brake cylinder to the brake shoes with equal braking force to each brake shoe which engages the wheels or brake drums or discs of the various cars and locomotives of the train.

Another object of my invention is to provide means whereby the hydraulic braking system can be actuated by manual means without the use of levers, pull rods and chains as conventionally used, such means operable from either end of the car or both ends if so desired.

Another object of my invention is to provide a single air-hydraulic cylinder to operate a hydraulic brake shoe cylinder of a car or other unit which is supplied with air for braking from the conventional air-brake system by means of the triple valve so that the brake functions in the conventional manner but without the use of brake rods, pull rods, chains and levers.

Another object of my invention is to provide an air-hydraulic brake cylinder for operating the hydraulic system by means of the conventional air brake system and provide automatic means of adding hydraulic make-up fluid that may be lost by leakage or other causes. This make-up means of hydraulic fluid makes it possible to operate the system for extra long periods of time without refill, which is important in railway operation. Other inventors have not made this important provision to insure long and effective operation in their disclosures of air-hydraulic braking systems. In my air-hydraulic braking cylinder I have provided an automatic valve to allow re-charge of the hydraulic cylinder which remains open when the braking system is automatically operated but this valve is closed automatically for manual operation.

Another object is to provide a simple and effective air-hydraulic system with few parts and low cost that can be applied to any type railway car using standard parts requiring only changes in piping lengths to suit any size car.

Other objects of my invention are to provide equal braking action on all wheels of the car regardless of the differences in the amount of wear of the various brake shoes, to provide means for the braking action to begin at the same moment on all the wheels, to remove all pull rods, levers and chains now used in the conventional system which cause the trucks to be pulled toward the center of the car when the brakes are applied and also tend to rotate the trucks about the bolster center due to the off center location of the pull rods. This truck rotation causes diametrically opposite wheels to run with higher wheel flange and rail contact loads. Under these unfavorable conditions the truck is mechanically diverted from its natural path and adds some operational hazard, particularly on curves. With my invention the truck runs as a unit where the braking action is within the truck structure and there is no force tending to move the truck to the center of the car, as in the conventional system.

My invention will eliminate all backlash adjusters or slack adjusters now used with some of the conventional braking systems and no adjustment is required for brake shoe wear or replacement as the air-hydraulic braking cylinder capacity is proportioned to cover the full wear range of the brake shoes, regardless of the wear in any or all of the shoes.

With my invention all the conventional lever systems are replaced by hydraulic conduits which are simple and easy to install and at lower costs. On such cars as gondolas with bottom doors which interfere with brake lever locations, my invention is particularly attractive as the conduit can be easily located where it is safe from damage. This is also true with the location of the air-hydraulic cylinder which cannot be placed under this type of car.

On steam locomotives where many obstructions exist for the lever system of braking, the air-hydraulic system has many advantages. It is also practicable to use only one air-hydraulic cylinder both for the locomotive and tender as these units always operate together. This air-hydraulic brake cylinder can be located upon the tender deck or any other convenient place where it is always accessible.

My invention contemplates no change in the conventional air braking systems, either direct or indirect air. My invention uses in place of the conventional air brake cylinder a braking cylinder of the air-hydraulic type where the energy from the air cylinder is transmitted directly to the hydraulic cylinder, thence through suitable conduits to the various braking cylinders. All other air braking apparatus such as train line, air reservoir, triple valve, etc., up to the brake cylinder, remains unchanged.

My invention consists of an air-hydraulic cylinder connected in the conventional manner and a hand operated cylinder for braking the car when it is not in the train—for example braking a car by hand over hump yards. The necessary conduit is so arranged that the car can be braked either by hand or automatically.

Other objects and purposes will appear from the detailed description of the invention following hereinafter, taken in conjunction with the accompanying drawings, wherein:

Fig. 1 is a longitudinal sectional view with certain parts in section of the combined air-hydraulic cylinder in accordance with the present invention;

Fig. 2 is a longitudinal sectional view of the manually operated brake cylinder which is connected to the hydraulic conduit system;

Fig. 3 is a perspective view of the hydraulic conduit system with the normally and manually operated actuating cylinders connected thereto; and Fig. 4 is a front elevation with certain parts in section of the hydraulic brake cylinder, pistons, brake shoes and hangers mounted on the truck bolster for cooperation with the railway wheels.

The air-hydraulic actuating cylinder as shown in Fig. 1 has an air cylinder 1, piston 2, return spring 3, piston 4 and conduit 5 which connects to triple valve of the pneumatic system, not shown. The portions of the air cylinder as described are the same details as a standard air brake cylinder. The hydraulic portion of the air-hydraulic cylinder is the hydraulic cylinder 6 having connection at 6' for hydraulic conduit 7. Piston 2 extends into hydraulic cylinder 6 acting as a piston equal to its diameter, increasing the hydraulic working pressures in proportion to the relative areas of the air cylinder 1 and hydraulic cylinder 6.

Hydraulic cylinder 6 is provided with a supply reservoir 8 with filler cap 9, vent 10, air operated valve 11, held closed by spring 12, and screw plug 13. Valve 11 operates in cylinder bore 11' with air connection 14 with conduit pipe 15 connected to train line 16 as shown. Passage 6" connects hydraulic cylinder 6 with supply reservoir 8, as shown.

Valve 11 is held open when there is air pressure on train line 16 so that brake fluid can be supplied from reservoir 8 to hydraulic cylinder 6 to make up any deficiencies due to leakage. However, when the car is not in the train and there is no pressure on train line 16, valve 11 is closed by spring 12 and no brake fluid can pass from cylinder 6 to reservoir 8 when hand brake wheel 17 is operated for hand braking as when, for example, the car is pushed over the hump yard. The brake fluid from the hand brake 17 goes directly to brake cylinders 18 through conduits 19, 20, 21 and 22 and cannot enter reservoir 8 through conduit 7, hydraulic cylinder 6 and valve 11.

Valve 11 closes the system for hand operation when piston 2 is in full released position and passage 6" is uncovered. When the air-hydraulic system is in operation as when the car is in the train, piston 2 covers passage 6" when it is advanced for braking by air cylinder 1.

Valve 11 will close during the normal braking period when the train line pressure falls below say 10 lb./sq. in. but in any case valve 11 remains open long enough to keep hydraulic cylinder 6 supplied with braking fluid. On the other hand, when the car is out of the train and there is no air pressure on train line 16, valve 11 is always closed to insure the proper operation of hand brake 17 and so that there will be no discharge of braking fluid from cylinder 6 to reservoir 8.

For hand braking the car when the train line 16 is not connected, hand wheel 17 (Figs. 2 and 3) operates piston 23 in cylinder 24 by means of screw 25. Piston 23 is provided with screw 24' which engages the keyway 23' to prevent rotation of piston 23 by screw 25. This hand brake can be located in any convenient place on the car and eliminates all pull rods and chains that are generally used in the conventional air brake system.

Mounted on the truck bolster 26 (Fig. 4), which is supported by end frames 27, is one hydraulic brake cylinder 18 for each two car wheels 28. Cylinder 18 is provided with two pistons 29 operating in opposite directions through connecting rods 30 to brake shoe carrier 31 which is pivoted to hinge bracket 32 which is fastened to bolster 26 as shown. Each shoe bracket 31 carries a replaceable brake shoe 33 which engages the corresponding car wheel 28. Pistons 29 are held in the off-braking position by springs 34 which disengage the brake shoes 33 from wheels 28 and return the braking fluid from cylinder 18 to air-hydraulic cylinder 6 or to hand brake cylinder 24 as the case might be. Conduit 19 is connected to brake cylinder 18 as shown. Removable plug 35 is used in the filling operation and to remove entrapped air. Brake cylinder 18 is to be proportioned in stroke to cover the wearing life of brake shoes 33 so no mechanical adjustment is required.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. In a combined air-hydraulic braking system for vehicles including an air line, a hydraulic brake-shoe cylinder, a hydraulic conduit system communicating with said cylinder containing a liquid body therein and selectively controlled by the air line of the system or manually, a combined air and hydraulic actuating cylinder connected to one end of said hydraulic conduit system, means for maintaining said last-mentioned cylinder always filled with liquid comprising a reservoir containing make-up liquid, a passage between said last-mentioned cylinder and reservoir, a spring pressed valve in said passage biased to closed position and operable by the air pressure in the air line to open position to maintain said actuating cylinder in a filled state, a second actuating cylinder connected to another part of said hydraulic conduit system, and a manually operated piston therein for manually controlling the transmission of pressure through said liquid body to the hydraulic brake-shoe cylinder.

2. A braking system as set forth in claim 1 wherein said first actuating cylinder is formed of a portion of large cross-sectional area and another portion of small cross-sectional area, conduit connections from the air line of the system to said first-mentioned portion and from the other portion to the hydraulic conduit system, and a piston movable in said cylinder having one end thereof conforming to said first portion and adapted to be actuated by the air supply for transmitting force to the liquid body through the intermediary of the other end of the piston conforming to the small cross-sectional area of said cylinder.

3. A braking system as set forth in claim 1 wherein said liquid reservoir for the hydraulic conduit system is formed as an integral part of the first actuating cylinder and is vented to atmosphere.

4. In a combined air-hydraulic braking system for railway car trains designed for automatic operation by the conventional air brake system by variation of train line pressure and also capable of manual operation by the same hydraulic system at zero train line pressure when the car is not a part of the train, a hydraulic brake-shoe cylinder, actuating pistons for the brake shoes in said cylinder, a hydraulic conduit system communicating with said cylinder containing a liquid body therein, a combined air and hydraulic actuating cylinder connected to one end of said hydraulic conduit system, means for maintaining said last-mentioned cylinder always filled with liquid comprising a reservoir containing make-up liquid, a passage between said last-mentioned cylinder and reservoir, a spring pressed check valve in said passage biased to closed position and operable by the air pressure in the air line to open position to maintain said actuating cylinder in a filled state, a second actuating cylinder connected to another part of said hydraulic conduit system and a manually operated piston therein for manually controlling the transmission of pressure through said liquid body to the hydraulic brake-shoe cylinder and the pistons therein, and to produce pressure in a reverse direction in the first actuating cylinder to effect a positive closing of said valve in said passage in supplement to the action of said spring.

5. In a combined air-hydraulic braking system for railway car trains designed for automatic operation by the conventional air brake system by variation of train line pressure and also capable of manual operation by the same hydraulic system at zero train line pressure when the car is not a part of the train, a hydraulic brake-shoe cylinder, a hydraulic conduit system communicating with said cylinder containing a liquid body therein, a combined air and hydraulic actuating cylinder connected to one end of said hydraulic conduit system, a piston actuated by the air supply of the braking system operative therein, means for maintaining said last-mentioned cylinder always filled with liquid comprising a reservoir containing make-up liquid, a passage between said last-mentioned cylinder and reservoir opening directly in front of the piston in the hydraulic end of said actuating cylinder so that said passage is closed upon the initiation of travel of said piston to shut off communication between said cylinder and reservoir, a second actuating cylinder connected to another part of said hydraulic conduit system, a manually operated piston therein for manually controlling the transmission of pressure through said liquid body to the hydraulic brake shoe cylinder, and a check valve in said passage for closing off the hydraulic conduit system from said reservoir during the operation of said manually operated piston.

EDWIN B. HUDSON.

REFERENCES CITED

The following references are of record in the file of this patent:

UNITED STATES PATENTS

| Number | Name | Date |
|---|---|---|
| 1,987,435 | Engel | Jan. 8, 1935 |
| 2,071,297 | Dodge et al. | Feb. 16, 1937 |
| 2,092,251 | Heidloff | Sept. 7, 1937 |
| 2,098,666 | La Brie | Nov. 9, 1937 |
| 2,150,617 | Weihe | Mar. 14, 1939 |
| 2,208,107 | Simanek | July 6, 1940 |
| 2,248,435 | Pleines | July 8, 1941 |
| 2,272,872 | Wilson | Feb. 10, 1942 |
| 2,299,932 | Scott | Oct. 27, 1942 |
| 2,308,499 | Eksergian | Jan. 19, 1943 |
| 2,329,838 | Jeffrey | Sept. 21, 1943 |

FOREIGN PATENTS

| Number | Country | Date |
|---|---|---|
| 190,881 | Switzerland | Aug. 2, 1937 |